United States Patent [19]

Rautenberg

[11] Patent Number: 5,151,847
[45] Date of Patent: Sep. 29, 1992

[54] DEVICE FOR ELECTRICALLY CONTACTING AN ELECTRONIC APPARATUS WITH AN IC-MEMORY CARD

[75] Inventor: Paul-Georg Rautenberg, Wuppertal, Fed. Rep. of Germany

[73] Assignee: Stocko Metallwarenfabriken Henkels und Sohn GmbH & Co., Wuppertal, Fed. Rep. of Germany

[21] Appl. No.: 677,587

[22] Filed: Mar. 29, 1991

[30] Foreign Application Priority Data

Mar. 31, 1990 [DE] Fed. Rep. of Germany ....... 4010398

[51] Int. Cl.$^5$ .............................................. H05K 1/14
[52] U.S. Cl. ................................... 361/395; 361/391; 361/394; 361/412; 361/415
[58] Field of Search ............... 361/391, 415, 413, 412, 361/394, 395, 399; 439/259, 260, 261, 263, 264

[56] References Cited

U.S. PATENT DOCUMENTS 4,940,418  7/1990  Shimizu et al. ...................... 439/260
4,996,631  2/1991  Freehauf .............................. 361/415

Primary Examiner—Leo P. Picard
Assistant Examiner—Young Whang
Attorney, Agent, or Firm—Robert W. Becker & Associates

[57] ABSTRACT

A device for electrically contacting respective contacts of an electronic apparatus with an electronic card that has contacting poles one side thereof is provided. The electronic apparatus has a housing into which the electronic card with the side having the contacting poles leading is inserted via an insertion opening. The housing is provided with contact elements that corresponds to the contacting poles of the electronic card and with which the contacting poles of the electronic card after insertion of the card into the housing are in contact. The housing is also provided with a spring-type ejecting device for ejecting the electronic card. The electronic card is inserted directly between a bottom and a cover of the housing whereby the leading side of the electronic card directly contacts the contacting elements and at the same time loads the ejecting device. A releasable arresting device in the form of a catch is formed as an integral part of the housing and is disposed at the insertion opening. It serves to arrest the electronic card inside the housing.

8 Claims, 2 Drawing Sheets

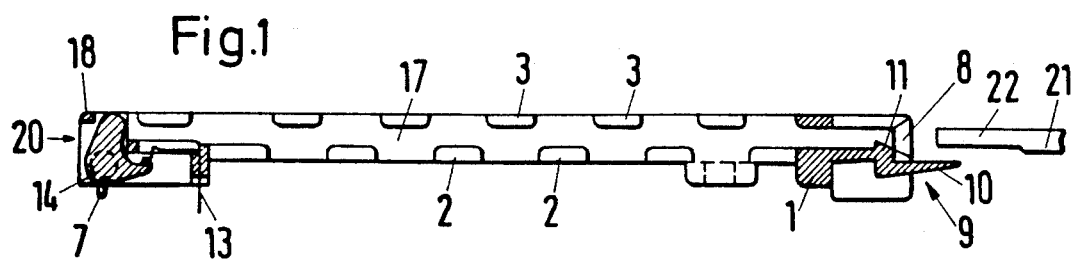
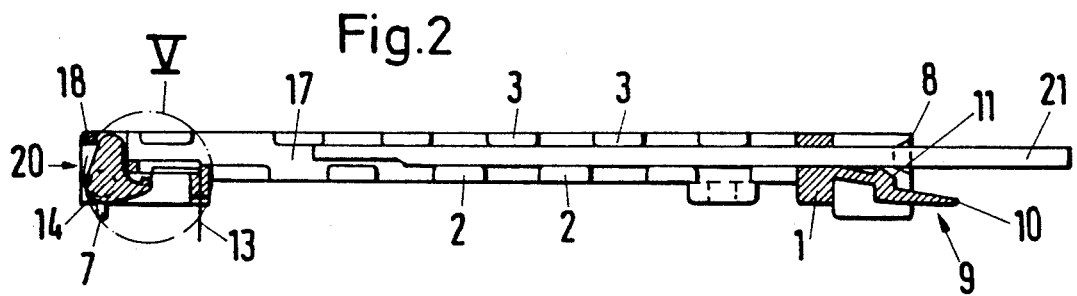
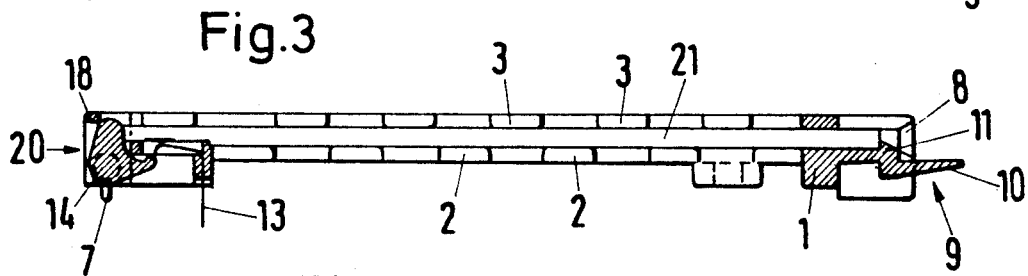
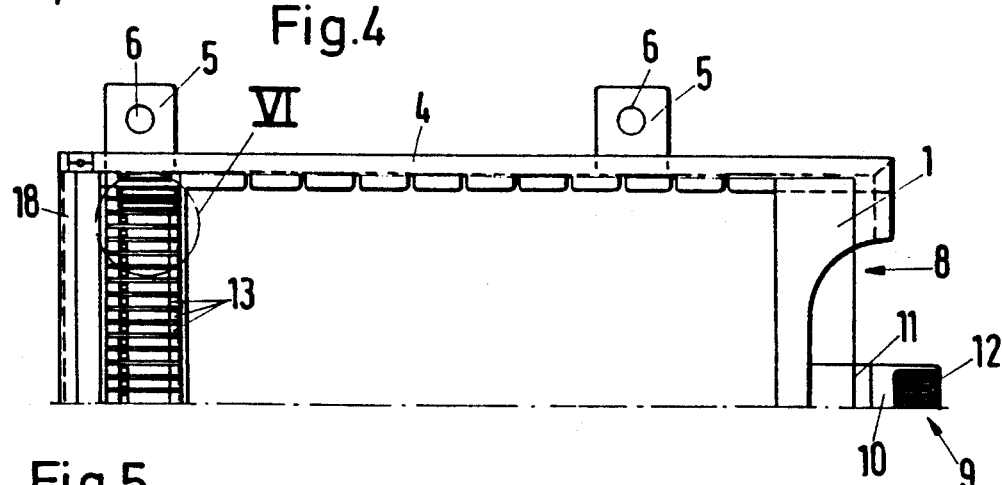
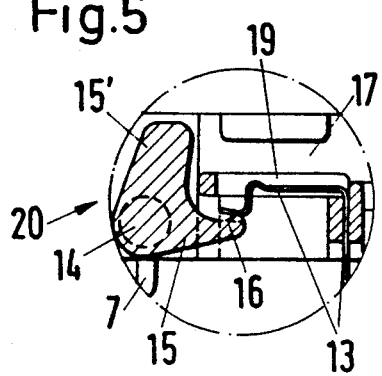
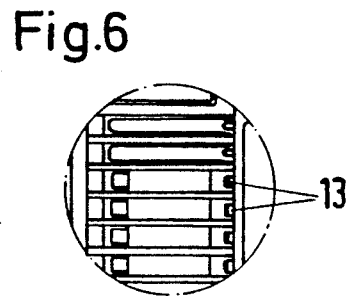

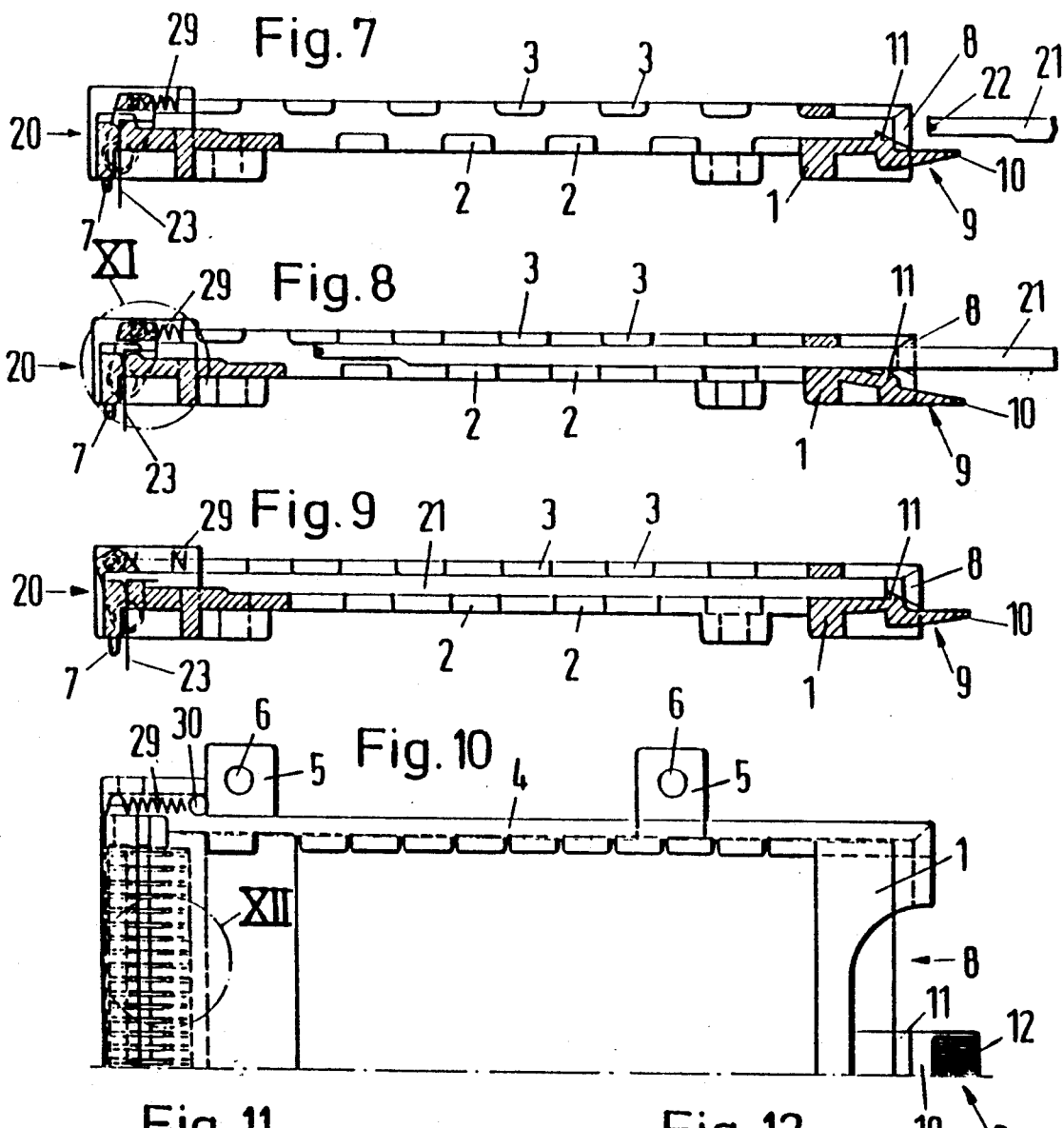

DEVICE FOR ELECTRICALLY CONTACTING AN ELECTRONIC APPARATUS WITH AN IC-MEMORY CARD

BACKGROUND OF THE INVENTION

The present invention relates to a device for electrically contacting respective contacts of an electronic apparatus with an electronic card, especially an IC-memory card, that has contacting poles along one side, whereby a housing is arranged at the electronic apparatus. The electronic card with the side that has the contacting poles and is facing the housing is inserted into the housing via an insertion opening. The housing is provided with contact elements that correspond to the contacting poles of the electronic card. The contacting poles of the electronic card, after insertion of the card into the housing, are in contact with the contact elements. The housing is also provided with a spring-type ejecting means for ejecting the electronic card that is arrested in the housing.

In the office and data technology and in the computer area, so called IC-memory cards are employed. Specific data are saved on those electronic cards which may be processed via a compatible computer system. For this purpose, the IC-memory card is connected to the computer system in order to permit a respective data transfer.

For this data transfer the IC-memory card is provided with a plurality of contacting poles that are arranged along one of its sides.

A device for electrically contacting an IC-memory card with the respective contacts of a computer system according to the aforementioned kind is known from DE-OS 37 17 684, whereby the IC-memory card serves as an external memory. The contacting device has a housing into which the card, with the contacting poles at the leading edge, is inserted. On the side of the housing opposite the insertion opening, contact elements in the form of contact springs are arranged which correspond to the contacting poles of the card. After insertion of the card the contacting poles contact the contact elements or contact springs. For the insertion of the card into the housing a spring-loaded slide is arranged in that housing whereby the card to be contacted is first inserted into the slide and then the slide together with the card is moved into the direction of the contact elements against the force of a spring. Close to the contacting position, the face of the slide then pivots a lever, which in return pivots the contact springs that are arranged on that lever into a contacting position with the contacting poles of the card.

With this known contacting device it is disadvantageous that the construction is rather complicated requiring a plurality of springs, levers, electromagnets, sensors etc. This known contacting device is thus very susceptible to breakdowns, for example, when mechanical parts after a certain service life become worn. Also, the card is only loosely inserted into the housing so that the card may slide out of the housing thus interrupting the contact between card and the computer system. This results in interruption of the data transfer. The known device lacks an effective fixation of the card to be contacted inside the housing.

From DE-GM 86 05 522 an arresting/releasing device for a card reader is known. The housing is again provided with a slide for receiving the card to be contacted whereby the slide must be inserted against the force of a spring into a stationary housing. For the fixation of the card that is inserted into the housing via the slide, a pivotable arresting member having knife-like blades is arranged in the area of the insertion opening of the housing. This known contacting device is also of a fairly complicated design since a slide is used to introduce the card to be contacted into the housing. Also, the arresting member with its knife-like blades is provided as a component separate from the housing thereby rendering the design of the device rather complicated.

An arresting/releasing device for a card reader is known from DE-OS 35 18 247 in which the card is introduced into the card reader via an insertion slot. In order to arrest the card and in order to prevent the user from removing the card during the reading operation, an arresting member having a hook is provided. In a resting position, the hook protrudes into the insertion slot thus partially blocking the entrance. The hook of the arresting member catches the card upon completed insertion. The hook is removed from its blocking position in the insertion slot via a key that acts on a lever device engaging the arresting means. This arresting-/releasing device for a card reader is also of a rather complicated construction.

It is therefore an object of the present invention to provide a device for electrically contacting respective contacts of an electronic apparatus with an electronic card, especially an IC-memory card, of the aforementioned kind which prevents a sliding of the inserted card from the housing and also simplifies the constructive design of the contacting device.

BRIEF DESCRIPTION OF THE DRAWINGS

This object, and other objects and advantages of the present invention, will appear more clearly from the following specification in conjunction with the accompanying drawings, in which:

FIG. 1 is a side view of a first embodiment of the device of the present invention before the insertion of a card to be contacted;

FIG. 2 shows a device according to FIG. 1 after the card is partially inserted but before the actual contacting;

FIG. 3 shows a device according to

FIG. 1 and 2 after the completed insertion and contacting of the card;

FIG. 4 is a top view of the device of FIG. 3 with only half of the device being represented;

FIG. 5 shows an enlarged detail of FIG. 2;

FIG. 6 shows an enlarged detail of FIG. 4;

FIG. 7 is a side view of a second embodiment of the device of the present invention before the insertion of the card;

FIG. 8 is a device according to FIG. 7 after the card has been partially inserted but before the actual contacting;

FIG. 9 is a device according to FIGS. 7 and 8 after completed insertion and contacting of the card;

FIG. 10 is a top view of the device of FIG. 9 with only half of the device represented;

FIG. 11 is an enlarged detail of FIG. 8;

FIG. 12 is an enlarged detail of FIG. 10; and

FIG. 13 is an enlarged top view of the lever of the device according to the second embodiment.

SUMMARY OF THE INVENTION

The contacting device of the present invention is primarily characterized by the electronic card being inserted directly between a bottom and a cover of the housing whereby the side of the electronic card having the contacting poles directly contacts the contacting elements and cards the ejecting means; and a releasable arresting device in the form of catch that is formed as an integral part of the housing and is disposed at the insertion opening of the housing for arresting the electronic card that is inserted into the housing and is contacting the contact elements.

A device for electrically contacting an electronic card with respective contacts of an electronic apparatus according to the present invention is advantageous since, after the insertion of the card into the housing, the contacting position of the card is ensured by the catch so that the card may not accidentally slide out of the housing. Thus, in the contacting position of the card a flawless data transfer is ensured at all times. Also, the inventive contacting device exhibits a very simple constructive design which allows a flawless contacting with only a few parts. For example, the arresting device may be realized without additional expenditure since it is easy to form the simple catch during the injection molding of the plastic housing. Furthermore, the card to be contacted is directly responsible for the electrical contacting and also for the loading of the ejecting means without further intermediate parts being required. As a whole, the handling of the contacting device as well as of the electronic card to be contacted is greatly simplified and improved.

In a further embodiment of the catch it is provided with slanted guide portion for the electronic card whereby the slanted guide portion automatically positions the catch into a noncatching positions when the electronic card is inserted. With this embodiment, the insertion of the card into the housing effects the release of the arresting device without necessitating an additional handling by the operator.

Preferably, the catch has a tongue-shaped pressure surface to effect unlocking of the inserted electronic card. With the aid of such a pressure surface, the catch may be simply released by the operator by pressing the pressure surface in a downward direction with his finger.

In a first constructive embodiment of the ejecting means provided with spring device, the contact elements are in the form of contacting springs that have coordinated therewith a lever having two legs and being pivotably supported at the housing, whereby a first one of the two legs engages the contacting springs and a second one of the legs is being contacted by the side of the electronic card with the contacting poles, when the electronic card is inserted into the housing, and pivots the lever against a force of the contacting springs. The lever thus serves two purposes. On the one hand, it generates the contacting force when by insertion of the card the lever is pivoted and thereby via one leg of the lever, bends the contacting springs such that they come into contact with the contacting poles of the card and generate the contacting force. On the other hand, the lever serves to eject the card from the housing after release of the arresting device, whereby, due to force of the spring of the contacting springs, the lever is pivoted, thus ejecting the card from the housing.

In order to improve the interaction of the lever with the contacting springs the leg coordinated with the respective contacting springs is provided with knobs.

In a preferred arrangement of the contacting springs inside the housing, the contacting springs are only contacted when the lever is pivoted so that the insertion of the card is achieved with zero force (zero force in this context means that little or no force is required for the insertion).

In order to limit the pivoting movement of the lever, the housing is provided with an abutment for the lever.

In another embodiment ribs that are an integral part of the housing are arranged between the contacting springs. These ribs create sufficient air and creeping space. Also, in the inserted position of the electronic card, these ribs prevent a contacting of the contacting poles with the contacting springs. Furthermore, a defined travel stroke of the spring is created In a second constructive design of the ejecting means with a spring means, contact elements are provided in the form of contacting pins that are directed toward the insertion opening whereby contacting poles that are shaped corresponding to the contacting pins and a lever arranged opposite the insertion opening are provided. The lever is pivotable against a force of a spring when the card is inserted and the contacting poles are contacting the contacting pins. With this embodiment a so-called power socket is formed. The contacting poles of the card may be provided as sockets or springs. The lever serves as an ejecting means whereby, after releasing the arresting device, the spring pivots the lever such that the card inserted in the housing is ejected. Furthermore, the spring loaded lever provides a secure contacting of the contacting poles of the card with the contacting pins of the housing.

Preferably, the spring is a coiled tension spring. It may also be in the form of a coiled pressure spring or a spiral spring.

In a preferred embodiment, the lever is in the form of a bar that extends over the width of the housing in a direction parallel to the insertion opening. With this arrangement, a uniform force is exerted onto the entire width of the card.

The lever is preferably pivotably supported at the housing via journal pins provided at the ends of the bar.

The housing is also provided with an abutment for the card so that the insertion of the card into the housing is limited by the abutment.

DESCRIPTION OF PREFERRED EMBODIMENTS

The present invention will now be described in detail with the aid of two specific embodiments utilizing FIGS. 1 to 13.

FIGS. 1 to 6 present a first embodiment of a contacting device of the present invention whereby the IC-memory card to be contacted is inserted with zero force, while the embodiment represented in FIGS. 7 to 13 show a contacting device in the form of power socket.

The first embodiment according to FIGS. 1 to 6 comprises a plastic housing 1. The housing 1 has a bottom with transverse support ribs 2 and a cover provided with ribs 3 that are also arranged in a transverse direction and are staggered with respect to the support ribs 2 of the bottom. The housing 1 has side walls 4. Fastening ledges 5 are arranged at the side walls 4 and are provided with screw holes 6 with which the housing 1 may be attached to a circuit board of an electronic apparatus. For this purpose, there are also fastening pins 7 provided which are an integral part of the bottom of the housing 1.

On a face of the housing 1 (right hand side of the drawing) a slot-like insertion opening 8 is provided which is slightly funnel-shaped. In the area of the insertion opening 8 an arresting device 9 is provided at the bottom of the housing 1. The arresting device 9 is in the form of a catch 10. The catch 10 is an integral part of the housing 1 and has on its upper side a slanted guide portion 11 with a pressure surface 12. With the pressure surface 12 the catch 10 may be moved in a downward direction. On a side of the housing 1 that is opposite the insertion opening 8 contact elements in the form of contacting springs 13 which are preferably in the form of leaf springs are provided. As can be seen especially in FIG. 5, the contacting springs 13 have an angular shape with one leg being inserted into the bottom of the housing while the other leg is arranged perpendicular to the first leg and protrudes essentially parallel to the plane of the housing 1 This row of contacting springs 13 is connected to respective contacts of an electronic apparatus, for example, with leads of a circuit board to which the housing 1 is attached.

In the area of the contacting springs 13 a lever 14 having two legs is arranged. The lever 14 is supported in a freely pivotable manner at the housing 1 with the pivoting axis being arranged in the direction of the rows of contact springs 13. As can be seen in FIG. 5, the contact springs 13 are arranged on the leg 15 of the lever 14 whereby the leg 15 on its upper side is provided with knobs 16. The other leg 15' which is arranged at an acute angle relative to the leg 15 extends in an upward direction and limits in the direction of insertion the receiving space 17 which is defined by the bottom and the cover of the housing 1.

The pivoting movement of the lever 14 and accordingly of the leg 15' is limited by an abutment 18 which is provided as a strip that is formed as an integral part of the housing 1. The housing 1 is also provided with ribs 19 which extend beyond the contacting springs 13 so that, in a resting position of the contacting springs 13, the contacting springs 13 are arranged in an intermediate space defined by the ribs 19.

The contacting springs 13 together with the lever 14 constitute an ejecting means 20. In the following paragraphs the function of the contacting device will be explained in further detail.

To achieve contacting the card 21 is inserted via the insertion opening 8 into the housing 1. The card 21 is provided with contacting poles 22 along one side thereof. The distance between the contacting poles 22 corresponds to the distance between the contacting springs 13. In the first embodiment the contacting poles 22 of the card 21 are provided in the form of contact strips. As can be seen especially in FIGS. 1 and 2, the card 21, in the area of the contacting poles 22, is of a reduced width and is thus of a stepped contour.

When introducing the card 21 into the receiving space 17 of the housing 1, the card 21 first glides on the slanted guide portion 11 of the catch 10 so that the catch 10 is suppressed, as can be seen in FIG. 2. During the insertion movement of the card 21 the support ribs 2 and the ribs 3 provided at the cover of the housing 1 prevent a displacement of the card 21 in a downward direction. As soon as the leading edge of the card 21 reaches the leg 15', the lever 14 is pivoted in a counter-clockwise direction. Before this pivoting action occurs no contacting between the contacting poles of the card 21 and the contacting springs 13 of the housing 1 has taken place. Only upon the pivoting movement of the lever 14 are the contacting springs 13 forced in an upward direction by the leg 15 such that the contacting springs 13 contact the contacting poles 22 of the card 21. The pivoting action of the lever 14 thereby generates the necessary contacting force. Thus, the card 21 is contacted. At the same time, the catch 10 moves upward, because the backside of the card 21 has passed the catch 10. The card 21 is thus arrested and cannot be removed.

When releasing the card 21 from its contacting position, the operator presses the pressure surface 12 of the catch 10 so that the card 21 is disengaged. Since the contacting springs 13 move the lever 14 in a clockwise direction, the leg 15' pushes the card 21, after the disengagement, in a direction counter to the insertion direction past the insertion opening 8 of the housing 1, so that the card 21 may be easily removed from the housing. This device also functions when the housing 1 is in a vertical arrangement.

The second embodiment according to the FIGS. 7 to 13 differs from the first embodiment only in that the contact elements and the design of the ejecting means 20 are different.

In the second embodiment, the contact elements are formed by contacting pins 23 that have a square cross-section. The contact pins 23 have an angular shape with one leg being fastened at the bottom of the housing 1 and with the other leg extending in the direction of the insertion opening 8 of the housing 1, as can be seen especially in FIGS. 11 and 12. These contacting pins 23 correspond to the contacting poles 22 of the card 21, which in this embodiment, are represented as sockets or springs.

Between the side walls 4 of the housing 1 the lever 24 comprising only one leg is pivotably supported. The lever 24 is represented in FIG. 13 which also shows that the ends of a transverse bar 25 of the lever 24 is provided with lever parts 26 that are equipped at their outer sides with journal pins 27. The lever 24 is pivotably supported via the journal pins 27 at the side walls 4 of the housing 1. The lever parts 26 are also equipped on their outer sides with fastening lugs 28 for two springs 29, provided in the form of a coil-shaped tension spring. The other end of the spring 29 is respectively connected to a fastening lug 30 of the housing 1. The springs 29 force the lever 24 in the direction of the insertion opening 8 of the housing 1.

This embodiment of the contacting device functions as follows. The card 21, with the side having the contacting poles 22 leading is inserted via the insertion opening 8 into the housing 1 by pressing the catch 10 in a downward direction. As soon as the card 21 is almost completely inserted into the housing 1 the leading side of the card 21 abuts the lever 24. At this point, no contacting is achieved yet. Upon further insertion of the card 21 into the housing the lever 24 is pivoted by a certain angle (counter-clockwise in the drawing). This effects the loading of the spring 29. At the same time, the card 21 with its contacting poles 22 in the form of sockets or springs slides over the contact pins 23 and thus makes contact. The forward motion of the card 21 is limited by an abutment 34 in the form of a strip provided at the housing. The catch 10 simultaneously catches and arrests the card 21 inside the housing 1 so that the card 21 may not be removed.

When releasing the card 21 from its contacting position the operator presses the pressure surface of the catch 10 in a downward direction. The card 21 is forced by the spring 29 in a direction opposite the insertion direction and is thus ejected via the insertion opening 8 from the housing 1. Thereby the contact between the contacting pins 23 and the contacting poles 22 of the card 21 is interrupted. The card 21 is thus disengaged and since it has been moved past the insertion opening 8 it may be removed. This embodiment also functions when operated in a vertical arrangement.

The present invention is, of course, in no way restricted to the specific disclosure of the specification and drawings, but also encompasses any modifications within the scope of the appended claims.

What I claim is:

1. A device for electrically contacting respective contacts of an electronic apparatus with an electronic card that has contacting poles along one side thereof, with a housing being arranged t said electronic apparatus, into which housing said electronic card with said side having said contacting poles and facing said housing is inserted via an insertion opening, with said housing being provided with contact elements, that correspond to said contacting poles of said electronic card and with which said contacting poles of said electronic card, after insertion of said card into said housing are in contact, and being provided with a spring-type ejecting means for ejecting said electronic card that is arrested in said housing, the improvement wherein:

said electronic card is inserted directly between a bottom and a cover of said housing, with said side of said electronic card having said contacting poles directly contacting said contacting elements and loading said ejecting means;

a releasable arresting device in the form of a catch that is formed as an integral part of said housing is disposed at said insertion opening of said housing for arresting a rear end of said electronic card that is inserted into said housing and is contacting said contact elements; and said contact elements are in the form of contacting springs that have coordinated therewith a lever having two legs and being pivotably supported at said housing, with a first one of said two legs engaging said contacting springs and with a second one of said legs being contacted by said side of said electronic card having said contacting poles, when said electronic card is in an inserted position in said housing, thereby pivoting said lever against a force of said contacting springs.

2. A device for electrically contacting according to claim 1, in which said catch is provided with a slanted guide portion for said electronic card, with said slanted guide portion automatically positioning said catch into a non-catching position during insertion of said electronic card.

3. A device for electrically contacting according to claim 1, in which said catch has a tongue-shaped pressure surface to effect unlocking of said inserted electronic card.

4. A device for electrically contacting according to claim 1, in which said contacting springs are leaf springs.

5. A device for electrically contacting according to claim 1, in which said first leg of said lever is provided with knobs that are coordinated with said contacting springs.

6. A device for electrically contacting according to claim 1, in which by pivoting said lever said contacting springs are contacted with said contacting poles of said electronic card.

7. A device for electrically contacting according to claim 1, in which said housing has an abutment for said lever.

8. A device for electrically contacting according to claim 1, in which ribs that are an integral part of said housing are arranged between said contacting springs.

* * * * *